United States Patent [19]

Addicks

[11] 4,322,087
[45] Mar. 30, 1982

[54] BICYCLE HANDLE BAR CONNECTOR

[76] Inventor: Lyle F. Addicks, 12313 Brookshire Ave., Downey, Calif. 90242

[21] Appl. No.: 183,934

[22] Filed: Sep. 4, 1980

[51] Int. Cl.$^3$ ............................................. B62K 21/22
[52] U.S. Cl. .................................. 280/279; 74/551.1; 403/191
[58] Field of Search .............. 280/279, 280; 403/191, 403/234, 237, 374; 74/551.1, 551.2

[56] References Cited

U.S. PATENT DOCUMENTS

| | | | |
|---|---|---|---|
| 3,333,862 | 8/1967 | Rockwell | 280/280 |
| 3,874,701 | 4/1975 | Soong | 280/279 |
| 4,068,858 | 1/1978 | Harrison et al. | 280/279 |

Primary Examiner—Joseph F. Peters, Jr.
Assistant Examiner—Donn McGiehan
Attorney, Agent, or Firm—John T. Matlago

[57] ABSTRACT

A bicycle handle bar connector is provided for connecting a handle bar to the front fork of a bicycle. The connector comprises an upper and lower sheet metal member, each formed with an arcuate middle portion and flat end portion. The lower sheet metal member has one of its flat end portions welded to the top of a tubular stem. A plastic coating is molded about the back and the end portions of the lower sheet metal member and including the upper end portion of the tubular stem, and a plastic coating is also molded about the back and the end portions of the upper sheet metal member. The inner surfaces of the arcuate middle portions of the upper and lower sheet metal members are not covered with the plastic coating so that these surfaces can engage the surface of the handle bar. The connector is connected by a locking cam mounted on the bottom of the stem to the upper end of the front fork of the bicycle.

9 Claims, 11 Drawing Figures

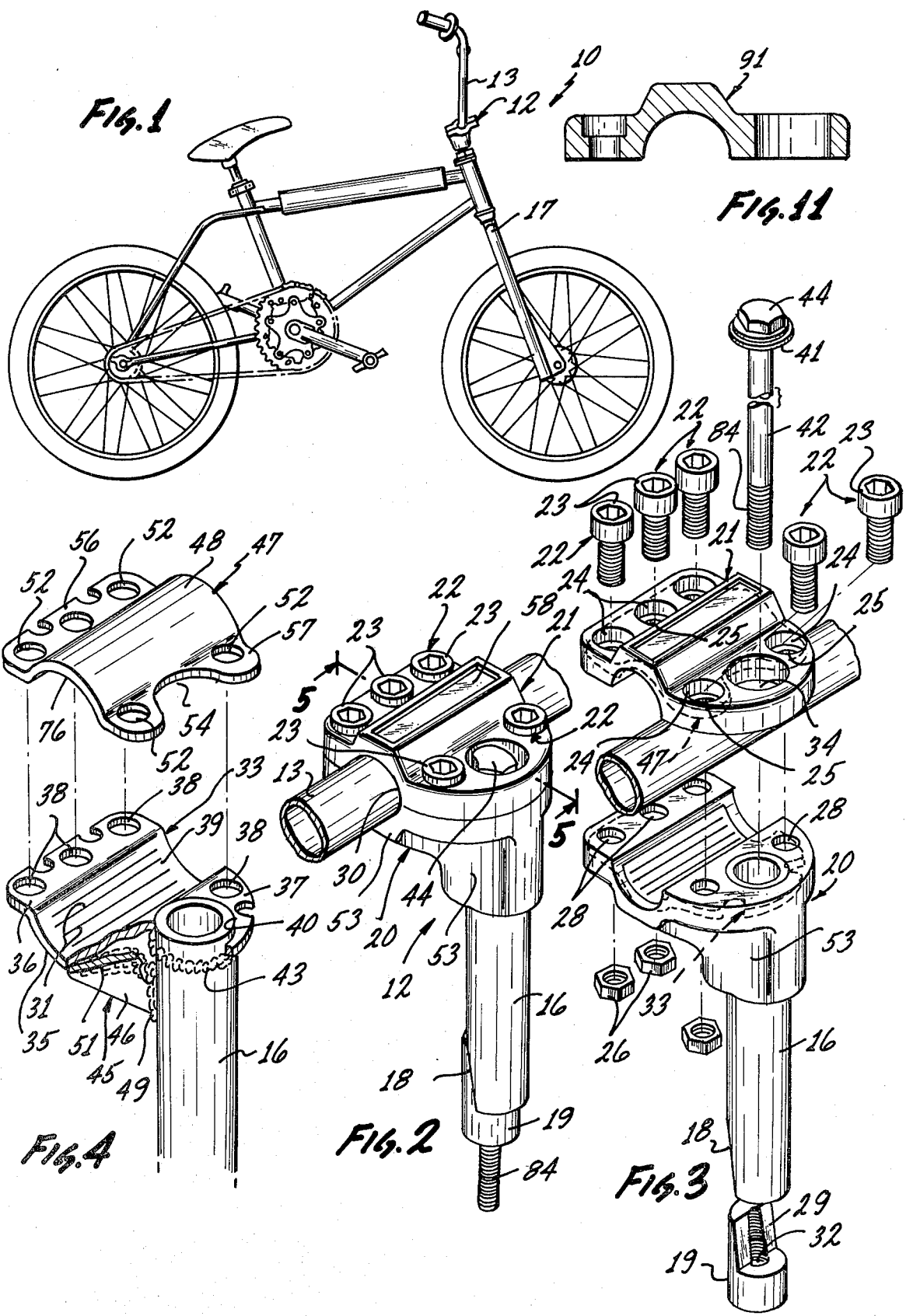

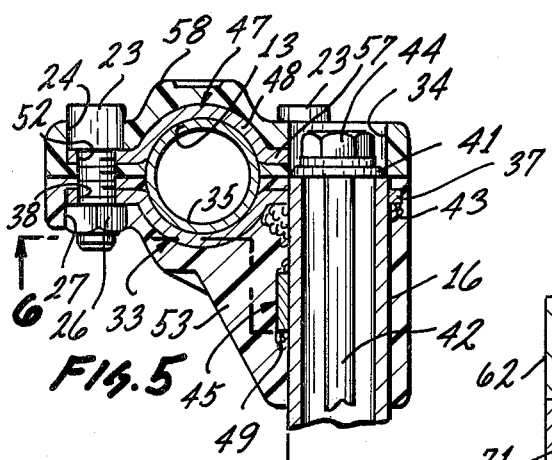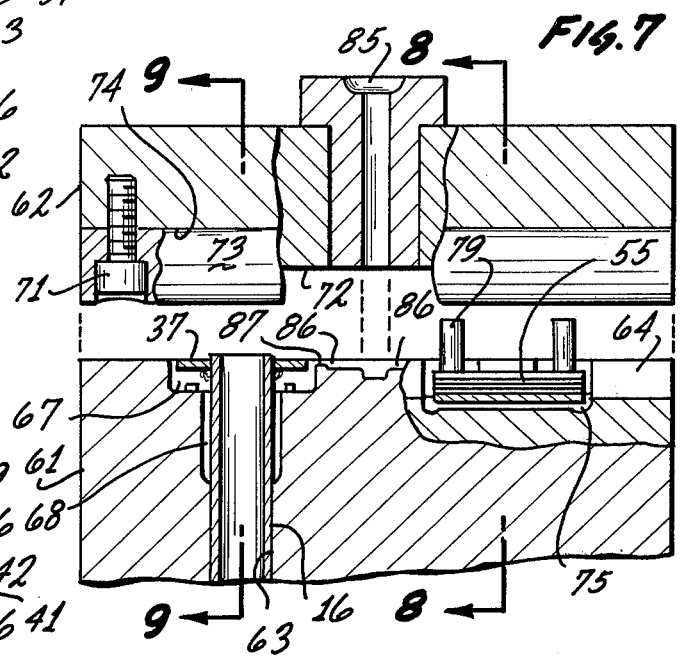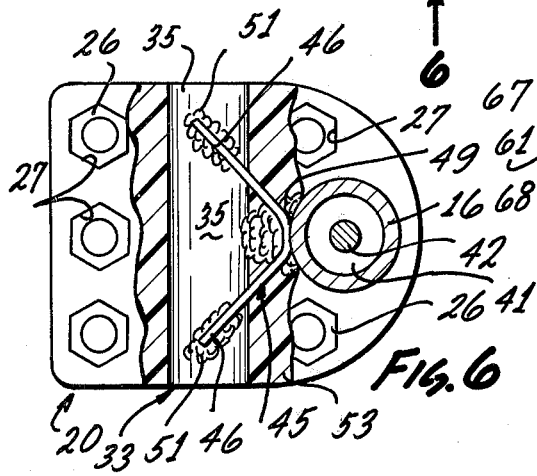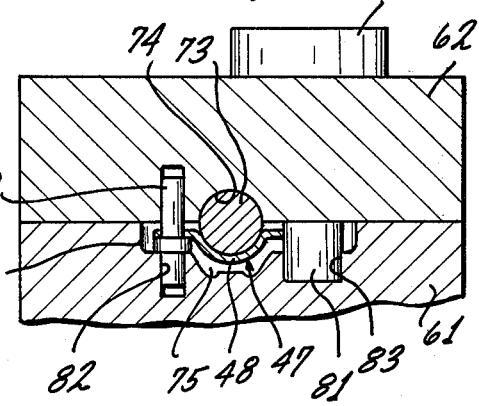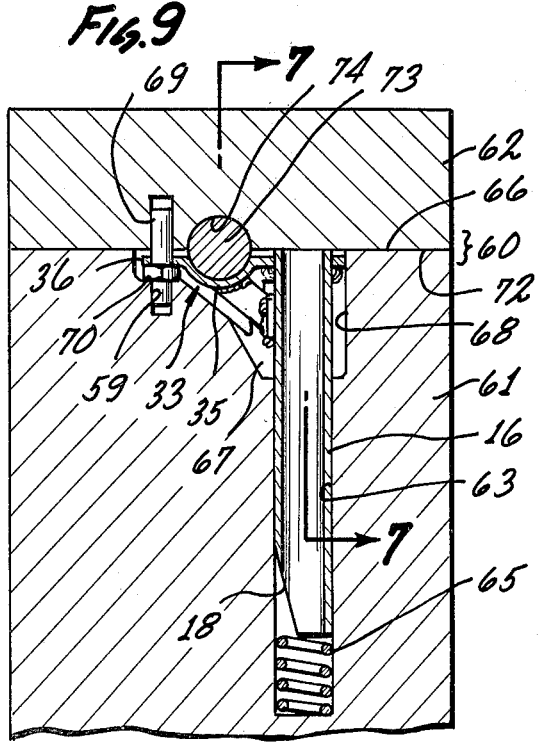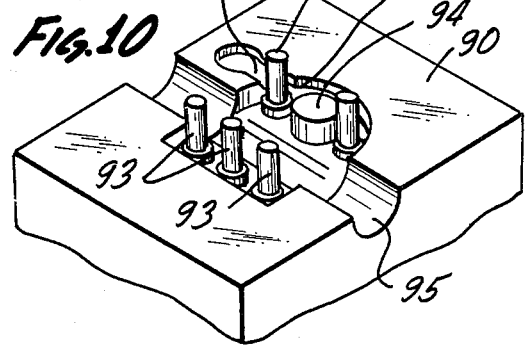

4,322,087

BICYCLE HANDLE BAR CONNECTOR

BACKGROUND OF THE INVENTION

This invention relates to bicycles and more particularly to a connector for adjustably interconnecting a handle bar onto the front fork of a bicycle.

It is important for a handle bar of a bicycle to be adjustably mounted on a horizontal axis by a clamp on the upper end of a tubular stem which is, in turn adjustably mounted on a vertical axis to the front fork of the bicycle. The providing of a connector for this purpose is complicated by the fact that the portion of the connector used for the adjustable attachment of the handle bar is separate and independent of the portion of the connector used for attachment to the front fork. Prior art connectors of this type have been made either of a forging or by welding or bolting the clamp for the handle bar to the stem so as to provide a "gooseneck" connector.

SUMMARY OF THE INVENTION

In accordance with the present invention, a lower sheet metal member which is included in a lower clamp half provided for the handle bar is formed with a middle arcuate portion and flat end portions having fastening holes therein. One of the flat end portions of the lower sheet metal member is provided with a circular opening which fits over the top of the tubular stem and is welded in position. To further strengthen the connection, a gusset is welded in the corner formed by the flat end portion and the tubular stem. A coating of plastic is molded over the bottom outer surface of the middle arcuate portion and about the flat end portions of the lower sheet metal members and including the upper end portion of the tubular stem. The molded plastic coating forms hexagonal openings on the bottom of the flat end portions which are aligned with the fastening holes therein and forms flat faces on the top of the flat end portions. The molded plastic coating does not cover the inner surface of the middle arcuate portion but forms therewith a semicircular opening for receiving the handle bar.

An upper sheet metal member which is included in the upper clamp half which mates with the lower clamp half to hold the handle bar is formed with a middle arcuate portion and flat end portions having fastening holes therein. A coating of plastic is molded over the upper outer surface of the middle arcuate portion and about the flat end portions of the upper sheet metal member. The molded plastic coating forms enlarged cylindrical openings on the top of the flat end portions which are aligned with the fastening holes therein and forms flat faces on the bottom of the flat end portions. The molded plastic coating does not cover the inner surface of the middle arcuate portion but forms therewith a semicircular opening for receiving the handle bar. With the upper and lower clamp halves fitted about the handle bar, the heads of the fastening bolts are seated in the cylindrical openings provided on the ends of the upper clamp half and the threaded ends of the bolts are engaged by hexagonal nuts which are seated in the hexagonal openings provided on the ends of the lower clamp half.

One of the objects of the present invention is to provide a light weight, low cost connector including a clamp portion for use in adjustably attaching thereto the handle bar of a bicycle, and including a tubular stem portion for use in adjustably attaching to the front fork of the bicycle.

Another object of the present invention is to provide a connector formed of a lower sheet metal member which has one end portion thereof welded to a tubular stem and is provided with a molded plastic coating to form a lower clamp half, and an upper sheet metal member which is provided with a molded plastic coating to form a mating upper clamp half.

Another object of the present invention is to provide a connector for use in attaching a handle bar of a bicycle onto the front fork thereof wherein the structural members for the upper and lower clamp halves for holding the handle bar are formed of sheet metal members and a coating of plastic is molded about the outer surfaces of these structural members primarily to improve the appearance thereof.

With these and other objects in view, the invention consists of the construction, arrangement and combination of the various parts of the device whereby the objects contemplated are attained, as hereinafter more fully set forth, pointed out in the appended claims and illustrated in the accompanying drawings.

BRIEF DESCRIPTION OF THE DRAWINGS

FIG. 1 is a view of a bicycle utilizing the connector of the present invention to adjustably connect the handle bar to the front fork thereof;

FIG. 2 is an enlarged view of the connector of the present invention;

FIG. 3 is an exploded view of the parts forming the connector of the present invention;

FIG. 4 is a perspective view of the upper and lower sheet metal members and the tubular stem used to form the connector of the present invention;

FIG. 5 is a vertical sectional view of the connector as taken on line 5—5 of FIG. 2;

FIG. 6 is a bottom view of the connector as taken on line 6—6 of FIG. 5 showing a portion of the plastic coating removed therefrom;

FIG. 7 is a sectional view of the mold as taken on line 7—7 of FIG. 9 showing the upper and lower blocks thereof spaced apart;

FIG. 8 is a sectional view of the portion of the mold used for coating the upper sheet metal member has taken on line 8—8 of FIG. 7;

FIG. 9 is a sectional view of the portion of the mold used for coating the lower sheet metal member and the upper end portion of the tubular stem as taken on line 9—9 of FIG. 7;

FIG. 10 is a modified lower block of the mold adapted for use in die casting an all metal upper clamp for the connector; and FIG. 11 is a cross sectional view of the all metal upper clamp half which is die cast by use of the lower block of the mold shown in FIG. 10.

DESCRIPTION OF THE PREFERRED EMBODIMENT

Referring to the drawings, FIG. 1 shows a bicycle 10 using the connector 12 of the present invention to attach the handle bar 13 to the upper end of the front fork 17 thereof.

As illustrated in FIGS. 2 and 3, the connector 12 comprises a lower clamp half 20 attached by one end thereof to the upper end of a tubular stem 16 and a mating upper clamp half 21. The clamp halves 20 and 21 are shaped to form a transverse circular opening 30 which engages the handle bar 13.

Five socket head bolts 22 pass through the holes 25 on the ends of the upper clamp half 21 and the aligned holes 28 in the lower clamp half 20 with their heads 23 seated in cylindrical openings 24 in the upper clamp half 21. Hexagonal nuts 26 engage the threaded ends of the bolts 22 and are seated in hexagonal openings 27 (FIG. 6) in the lower clamp half 20. The clamp halves 20 and 21 thus securely grip the handle bar 13 without slippage at a desired horizontal rotational position in the transverse cylindrical opening 30 provided thereby.

As best illustrated in FIG. 3, the tubular stem 16 is provided with an angular cut 18 on the sidewall of the bottom portion thereof. Adapted to fit on the lower end portion of stem 16 is a cylindrical locking cam 19 having an angular cut 18 on the tubular stem 16. The locking cam 19 is provided with a threaded opening 32 in the bottom portion thereof. A rod 42 provided with a hexagonal head 44 on the upper end thereof and a washer 41 is inserted down through the opening 34 provided in the upper clamp half 21 and through the tubular stem 16, in which it has a loose fit, such that the threaded lower end 84 thereof engages the threaded opening 32 in the locking cam 19. The locking cam 19 is thus held with its angular cut 29 engaged against the angular cut 18 on the tubular stem 16.

It should now be clear that the tubular stem 16 of connector 12 together with the locking cam 19 on the bottom thereof is inserted into the interior of the upper tubular stem (not shown) of the front fork 17. The connector 12 is then held at a desired vertical rotational position by causing the rod 42 to draw the locking cam 19 upwardly so as to be eccentrically disposed by sliding relative to the angular cut to thereby engage the inner wall of the tubular stem on the front fork 17.

Next to be described is the construction of the lower clamp half 20 with the tubular stem 16 attached thereto and the upper clamp half 21. As illustrated by dashed lines in FIG. 3, the lower clamp half 20 includes a lower sheet metal member 33 and the upper clamp half 21 includes an upper sheet metal member 47.

Referring to FIG. 4, the sheet metal member 33 is a stamping formed with a middle arcuate portion 35 and flat end portions 36 and 37. The inner surface 39 of the arcuate portion 35 is preferably provided with serrations 31 extending along the lenght thereof. The generally rectangularly shaped outer flat end portion 36 is provided with three spaced circular fastening holes 38 and the semicircularly shaped inner flat end portion 37 is provided with a centrally disposed circular opening 40 having a fastening hole 38 on either side thereof.

The lower sheet metal member 33 is positioned with its arcuate portion 35 extending downwardly and with the circular opening 40 of the flat end portion 37 thereof fitted over the upper end of the tubular stem 16. The underside of the lower sheet metal member 33 is welded as indicated by bead 43 to the tubular stem 16. A gusset 45 (FIG. 6) which is bent about its vertical center forms two angularly disposed arms 46 which are welded at their common central end by beads 49 to the tubular stem 16 and at their outer ends by beads 51 to the bottom of the middle arcuate portion 35 of the lower sheet metal member 33.

The upper sheet metal member 47 is a stamping formed with a middle arcuate portion 48 and flat end portions 56 and 57. The inner surface 76 of the arcuate portion 48 is preferably provided with serrations 55 extending along the length thereof. The generally rectangularly shaped outer flat end portion 56 is provided with three spaced circular fastening holes 52 and the inner flat end portion 57 thereof is provided with a rounded central notch 54 with fastening holes 52 on each side thereof.

A plastic coating 53 is molded about the upper end portion of the tubular stem 16 and each of the flat end portions 36 and 37 and the bottom of the lower sheet metal member 33 by use of a portion of the mold 60 shown in FIGS. 7 and 9.

The lower block 61 of the mold 60, as shown in FIG. 9, provides a cavity 67 therein having a shape which conforms to the outer surface contour of the lower clamp half 20 and including the upper end portion of the tubular stem 16. An elongated vertical hole 63 is formed on one end of the cavity 67. The hole 63 is formed with an enlarged diameter cylindrical opening 68 on the upper end portion thereof which forms a portion of the cavity 67. A semicircular opening 64 is provided on the face 66 of lower block 61 throughout the length thereof and extending transversely to the length of cavity 67. Five pin inserts 69 are held with a press fit in holes 59 provided in the lower bottom wall on the ends of the cavity 67 at locations conforming to the locations of the fastening holes 38 in the lower sheet metal member 33. Each pin insert 69 is formed with a hexagonally shaped intermediate portion 70 which rests against the bottom wall on the ends of the cavity 67. A coil spring 65 is seated in the bottom of hole 63. The tubular stem 16 with the inner end portion of the lower sheet metal member 33 welded on the top thereof is inserted into the cavity 67 with the tubular stem 16 positioned in the hole 63 with its bottom resting on the top of the coil spring 65 and with the lower sheet metal member 33 positioned with its fastening holes 38 fitted over the pin inserts 69 just above the hexagonally shaped intermediate portions 70. It should be noted that the tubular stem 16 has a relatively close fit within hole 63.

When so positioned, the lower sheet metal member 33 is suspended within the cavity 67 by the end portions 36 and 37 thereof held slightly above the hexagonally shaped intermediate portions 70 of the pin inserts 69 and with the top surface of the end portions 36 and 37 spaced below the upper face 66 of the lower block 61.

The upper block 62 has a cylindrical member 73 residing in a semicircular opening 74 provided on its bottom face 72 throughout the length of the upper block 62. The cylindrical member 73 is held in upper block 62 by recessed socket head bolts 71 on each end thereof (FIG. 7). The lower semicircular half of the cylindrical member 71 extends below the face 72 of the upper block 62.

When the upper block 62 of the mold 60 is lowered onto the lower block 61 thereof, the face 72 of the upper block 62 contacts the upper end of the tubular stem 16 and depresses the stem 16 against the coil spring 65 such that the flat end portions 36 and 37 of the lower sheet metal part 33 bear against the top of the hexagonally shaped intermediate portions 70 of the pin inserts 69. Furthermore, the lower semicircular half of cylindrical member 73 moves into the semicircular opening 64 in the lower block 61 and bears against the inner surface 39 of the arcuate portion 35.

A plastic coating 58 is molded about the upper sheet metal member 47 by use of another cavity 75 formed in the lower block 61 of the mold 60 as shown in FIGS. 5 and 6. Referring to FIG. 7, the cavity 75 which conforms in shape to the desired outer surface contour of the upper clamp half 21 is formed in the lower block 62 at a location spaced away from the cavity 67.

Five pin inserts 79 are positioned and held by a press fit in holes 82 provided in the bottom walls of the end portions of the cavity 75 at locations conforming to the location of the fastening holes 52 in the upper sheet metal member 47. Each pin insert 79 is formed with an intermediate cylindrical portion 80 the bottom of which rests on the bottom walls of the end portions of the cavity 75. In addition, a plug insert 81 is positioned with a press fit in an opening 83 provided in the bottom wall of the inner end portion of the cavity in the bottom wall of the inner end portion of the cavity 75 at a location conforming to the location of the tubular stem 16 in the lower half clamp 21. The upper sheet metal member 47 is positioned in the cavity 75 with its arcuate middle portion 48 extending downwardly therein and with the fastening holes 52 on its end portions fitted over the pin inserts 79 so as to rest on the cylindrical portions 80. When so positioned the central notch 54 on the upper sheet metal member 47 is positioned to straddle the plug insert 81. It should be noted that when the upper block 62 is lowered on the lower block 61 the lower semicircular half of cylindrical member 73 on the upper block 62 also bears against the inner surface of arcuate portion 48.

Thus, with the upper and lower sheet metal members 33 and 47 positioned in the cavities 67 and 75, respectively, and the upper block 62 lowered onto the lower block 61 of the mold 60, a molten plastic is fed through sprue 85 located midway of the rear ends of the two cavities 67 and 75 as shown in FIG. 7. The molten plastic enters the two cavities through side runners 86 and gates 87 to form the lower clamp half 20 and the upper clamp half 21.

It should now be clear that the plastic coating 53 on the end portions of the lower sheet metal member 33 is molded with hexagonally shaped openings 27 (FIG. 6) and the plastic coating 58 on the end portions of the upper sheet metal member 47 is molded with cylindrically shaped openings 24. The upper and lower clamp halves 20 and 21 are fastened together by inserting a bolt 22 in each fastening hole 25 in the upper clamp half 21 with the socket head 23 of the bolt 22 seated in the cylindrically shaped opening 24 thereof and the hexagonal nut 26 engaging the threaded end of the bolt 22 seated in the hexagonally shaped opening 27 on the lower clamp half 20. A socket head wrench is used to tighten and loosen the bolts.

The molded coatings 53 and 58 are preferably made of a nylon material having elastic characteristics which takes up any shock imparted to the connector 12 while riding the bicycle and keeps the hexagonal nuts 26 from working loose in the threaded ends of the bolts 22.

It should be especially noted that the plastic coating 53 which is molded about the lower sheet metal member 33 completely encircles the flat end portions 36 and 47 thereof and also encircles the upper end portion of the tubular stem 16. Likewise, the plastic coating 58 which is molded about the upper sheet metal member 47 completely encircles the flat end portions 56 and 57 thereof. This is necessary to hold the plastic coating on these members since the plastic material does not strongly adhere to the metal surface. However, because the cylindrical member 73 in the upper block 62 of the mold 60 engages the inner surfaces of the arcuate portions of the sheet metal members 33 and 47 during the molding process, these inner surfaces are not coated with the plastic so that they can bear against the tubular handle bar 13 about which the lower and upper clamp halves 20 and 21 are mounted. The sheet metal members 33 and 47 which may be sheared and shaped with a single stamping operation, need not have the sharp corners or any burrs removed therefrom since the plastic material will hold thereto better with such imperfections. Further, the weld beads for joining the lower sheet metal member 33 and the tubular stem 16 and the gusset 45 thereto do not have to be uniform or of a high quality for the same reason.

It should now be understood that the upper and lower sheet metal members 47 and 33 form the structural frame of the clamp halves 21 and 20. Thus, the molded-on coatings 58 and 53 primarily serve to respectively cover the outer surfaces of the upper sheet metal member 47 and the lower sheet metal member 33 together with the welded joint of the latter to the upper end of the tubular stem 16.

Thus, the plastic coatings 58 and 53 molded about the upper and lower clamp members 47 and 33 and the upper end portion of the tubular stem 16 are primarily for appearance purposes and add very little to the structural strength of the connector 12. However, as previously described, the plastic molded coating has other uses in that it provides openings on the upper clamp half 21 in which the cylindrical head of the bolts 23 can be fitted and seated and it provides openings 27 on the lower clamp half 20 in which the hexagonal nuts 26 engaging the threaded ends of the bolts can be fitted and seated. The seatings of the hexagonal nuts 26 in the hexagonal openings 27 obviate the need for lock washers.

As illustrated in FIG. 11, an alternate embodiment 91 of the upper clamp for the connector 12 can be die cast of a solid metal having a shape conforming to that of the upper clamp half 21.

To form upper clamp half 91 the mold 60 is provided with a modified lower block 90 which has been adapted for metal die casting, as shown in FIG. 10. The lower block 90 has a cavity 92 formed therein shaped exactly as the cavity 75 in the lower block 61. Likewise, cavity 92 has five pin inserts 93 located therein which are identical to pin inserts 79, and a plug insert 94 which is identical to plug insert 81. The lower block 90 has a semicircular opening 95 extending therethrough for receiving the cylindrical member 73 on the upper block 62 which may be used with the lower block 90. The runner 96 provided in the lower block 90 is enlarged as compared to runner 86 in lower block 61 so as to handle the molten metal which is preferably aluminum.

It should now be clear that to form the alternate upper clamp half 91 the use of the upper sheet metal member 47 is eliminated and with the upper block 62 carrying the cylindrical member 73 positioned over the lower block 90 a molten aluminum is poured through the sprue and via the runner 96 into the cavity 92. As seen in FIG. 11, the cross section of the modified upper clamp half 91 is identical to upper clamp half 21 except that the sheet metal member 47 is eliminated and the entire clamp half is formed of aluminum. Thus, the upper clamp half 91 can be mated similarly to upper clamp half 47 with the previously described lower clamp half 20 which includes the lower sheet metal member 37 welded at its end to the tubular stem 16 by use of the gusset 45. It should be appreciated that the plastic coating is much more important on the lower clamp half of the connector 12 because of the need to cover up the welded joint by which the lower sheet metal part 33 is joined to the stem 16.

While the connector shown and described herein has been adapted to fulfill the objects and advantages previously mentioned as desirable, it is to be understood that the invention is not limited to the specific feature shown and described but that the means and configuration herein disclosed are susceptible of modification in form, proportion and arrangement of parts without departing from the principle involved or sacrificing any of its advantages and the invention is therefore claimed in embodiments of various forms all coming within the scope of the claims which follows.

What is claimed is:

1. A connector for adjustably attaching a handle bar onto the front fork of a bicycle, said connector comprising:
   a lower clamp half including;
   a tubular stem;
   a lower sheet metal member having a middle arcuate portion and flat end portions with fastening holes therein, one of said flat end portions having an opening therein for receiving the upper end of said tubular stem and being anchored thereto by welding;
   a coating of plastic molded about the flat end portions and the back of the lower sheet metal member and about the upper side portion of the tubular stem, the inner surface of the middle arcuate portion of the lower sheet metal member being left uncoated, and the end portions of the coating having holes therein aligned with the fastening holes in the flat end portions of said lower sheet metal member; and
   an upper sheet metal member having a middle arcuate portion and flat end portions with fastening holes therein; and
   a coating of plastic molded about the flat end portions and the back of said upper sheet metal member, the inner surface of the middle arcuate portion being left uncoated, and the coating of plastic molded with holes therein aligned with the fastening holes in the upper sheet metal member and with an opening therein aligned with the opening on the top of said tubular stem;
   whereby a handle bar can be adjustably held between the uncoated arcuate inner surfaces of the upper and lower clamp halves and the clamp halves held together by fastening means passing through the fastening holes on the ends thereof; and
   means for use in adjustably attaching said stem to the front fork of the bicycle.

2. A connector as defined in claim 1 wherein said coatings of plastic are formed of nylon.

3. A connector as defined in claim 1 wherein said fastening means are socket head bolts having threaded ends and hexagonal nuts, and the holes in said molded plastic coating on the flat end portions of said upper sheet metal member form cylindrical openings on the outer wall thereof for seating the heads of said bolts, and the holes in said molded plastic coating on the flat end portions of said lower sheet metal member form hexagonal openings on the outer wall thereof for seating the hexagonal nuts engaging the threaded ends of said bolts.

4. A connector as defined in claim 3 wherein the heads of said bolts and the hexagonal nuts are seated directly against the flat end portions of the respective upper and lower sheet metal members.

5. A connector as defined in claim 1 wherein the coating of plastic coating on said lower clamp half completely encircles the flat end portions of said lower sheet metal and the upper end portion of said tubular stem.

6. A connector as defined in claim 1 including a gusset having a lower end portion welded to the side of said tubular stem and having a pair of spaced arms welded to the bottom of the middle arcuate portion of the lower sheet metal member.

7. A connector as defined in claim 1 wherein said means for use in attaching said stem to rotate with the front fork of the bicycle comprises:
   said tubular stem having an angular cut on the lower wall portion thereof;
   a locking cam having an angular cut on the upper wall portion thereof, said locking cam positioned with its angular cut engaging the angular cut on said stem, said locking cam having a threaded internal opening; and
   a rod having a head and a body with a threaded end extending down through the openings in said upper clamp half and said tubular stem to threadably engage the threaded internal opening of said locking cam;
   whereby the tubular stem can be attached to the upper end of the front fork of a bicycle by rotating the head of said rod.

8. A connector for adjustably attaching a handle bar onto the front fork of a bicycle, said connector comprising:
   a lower clamp half including:
   a tubular stem;
   a lower sheet metal member having a middle arcuate portion and flat end portions with fastening holes therein, one of said flat end portions being joined by welding to the upper end of said tubular stem; and
   a coating of plastic molded about the flat end portions and the back of the lower sheet metal member and about the upper end of the tubular stem and having an opening therein aligned with the opening in the tubular stem, the inner surface of the middle arcuate portion of the lower sheet metal member being left uncoated, and the end portions of the coating having holes therein aligned with the fastening holes in the flat end portions of said lower sheet metal member; and
   an upper clamp half, said upper clamp half being formed with flat end portions and an arcuate middle portion and with fastening holes on the end portions thereof aligned with the fastening holes in the lower clamp half and with an opening on one flat end portion thereof aligned with the opening on the top of the tubular stem;
   whereby a handle bar can be positioned between the arcuate inner surfaces of the upper and lower clamp halves and the clamp halves held together by fastening means passing through the fastening holes on the ends thereof; and
   means for use in attaching said stem to the front fork of the bicycle.

9. A connector as defined in claim 8 wherein said upper clamp half is die cast from aluminum.

* * * * *